United States Patent
Takagi et al.

(10) Patent No.: US 7,796,136 B2
(45) Date of Patent: Sep. 14, 2010

(54) IMAGE SIGNAL PROCESSING APPARATUS, MEMORY CONTROL METHOD, AND PROGRAM FOR IMPLEMENTING THE METHOD

(75) Inventors: Shin Takagi, Shinagawa-ku (JP); Hideyuki Rengakuji, Koto-ku (JP)

(73) Assignee: Canon Kabushiki Kaisha (JP)

( * ) Notice: Subject to any disclaimer, the term of this patent is extended or adjusted under 35 U.S.C. 154(b) by 746 days.

(21) Appl. No.: 11/176,865

(22) Filed: Jul. 7, 2005

(65) Prior Publication Data
US 2006/0007236 A1 Jan. 12, 2006

(30) Foreign Application Priority Data
Jul. 7, 2004 (JP) ............................. 2004-200766

(51) Int. Cl.
G06F 15/167 (2006.01)
G06F 12/02 (2006.01)
G09G 5/397 (2006.01)

(52) U.S. Cl. ....................... 345/547; 345/541; 345/543; 345/544

(58) Field of Classification Search ................. 345/543, 345/530, 541, 542, 544; 348/231.1; 711/100
See application file for complete search history.

(56) References Cited

U.S. PATENT DOCUMENTS

| 5,815,167 A * | 9/1998 | Muthal et al. ................ 345/541 |
| 6,108,693 A * | 8/2000 | Tamura ........................ 709/213 |
| 6,160,590 A * | 12/2000 | Shimizu et al. ............. 348/581 |
| 6,308,248 B1 * | 10/2001 | Welker et al. ................ 711/209 |
| 2002/0109689 A1 * | 8/2002 | Champion et al. .......... 345/536 |
| 2003/0210338 A1 * | 11/2003 | Matsuoka et al. ...... 348/231.99 |
| 2005/0140683 A1 * | 6/2005 | Collins et al. ................ 345/531 |

FOREIGN PATENT DOCUMENTS

| JP | 6-67632 A | 3/1994 |
| JP | 2000-197003 A | 7/2000 |
| JP | 2003-324644 A | 11/2003 |

* cited by examiner

*Primary Examiner*—Xiao M Wu
*Assistant Examiner*—Jacinta Crawford
(74) *Attorney, Agent, or Firm*—Rossi, Kimms & McDowell LLP

(57) ABSTRACT

An image signal processing apparatus which is capable of preventing the "simultaneous display of an original image and the immediately preceding image" as well as dropping of frames. A signal processor subjects an image pickup signal corresponding to a subject outputted from an image pickup device to signal processing. A VRAM (Video Random Access Memory) section is composed of at least three storage areas that store image signals outputted from the signal processing circuit. A VRAM management information section stores management information indicative of storage states of the respective storage areas of the VRAM section. A compression circuit subjects an image signal read from the VRAM section to compression processing. An image display processing circuit subjects an image signal read from the VRAM section to image display processing. An image display section displays images based on the image signal outputted from the image display processing circuit. A memory controller controls read/write operations for image signals in the respective storage areas of the VRAM section based on the management information stored in the VRAM management information section.

19 Claims, 16 Drawing Sheets

IMAGE SIGNAL PROCESSING APPARATUS, MEMORY CONTROL METHOD, AND PROGRAM FOR IMPLEMENTING THE METHOD

BACKGROUND OF THE INVENTION

1. Field of the Invention

The present invention relates to an image signal processing apparatus, a memory control method, and a program for implementing the method, and in particular to an image signal processing apparatus including an image pickup device that outputs an image signal corresponding to a subject, a memory control method applied to the image signal processing apparatus, and a program for causing a computer to execute the memory control method.

For example, the present invention is applied to an image signal processing apparatus that can pickup moving images where during moving image pickup, a display rate of an electronic viewfinder differs to an image recording rate.

2. Description of the Related Art

Conventionally, as an image signal processing apparatus where reading rate for reading from a VRAM (Video Random Access Memory), which is a memory storing image information, to an image display section is faster than writing rate for writing into the VRAM, an apparatus that uses and switches between two VRAMs to prevent "simultaneous display of an original image and the immediately preceding image" has been proposed (see Japanese Laid-Open Patent Publication (Kokai) No. H06-067632). The expression "simultaneous display of an original image and the immediately preceding image" refers to a phenomenon where images picked up at different times are read out to be displayed respectively at upper and lower parts of a screen due to reading of an image signal "overtaking" from a VRAM writing of another image signal into the VRAM during the writing of the latter signal into the VRAM or due to writing of an image signal into a VRAM "overtaking" reading of another image signal from the VRAM during the reading of the latter signal from the VRAM.

Another apparatus has been proposed that prevents writing from overtaking reading and reading from overtaking writing by switching the control method for reading from a VRAM and writing into the VRAM both when the rate of writing into the VRAM is faster than the rate of reading from the VRAM to an image display section and when the rate of reading from the VRAM to the image display section is faster than the ate of writing into the VRAM (see Japanese Laid-Open Patent Publication (Kokai) No. 2003-324644).

Another apparatus has been proposed that changes encoding parameters in accordance with the data amount of images when compressing and recording moving images in parallel with the displaying of images so that images can be stored in real time on a storage medium while appropriately controlling the compressed image data size (see Japanese Laid-Open Patent Publication (Kokai) No. 2000-197003).

However, the apparatuses disclosed in Japanese Laid-Open Patent Publications (Kokai) Nos. H06-067632 and 2003-324644 do not contemplate how to avoid the "simultaneous display of an original image and the immediately preceding image" when moving images are being displayed during the picking up of moving images.

The apparatus disclosed in Japanese Laid-Open Patent Publication (Kokai) No. 2000-197003 records moving images onto a recording medium in real time, and therefore, when the data amount of images suddenly changes, such as when the speed at which images change and/or the resolution of images suddenly change due to a change of scene, for example, a compression circuit cannot achieve a predetermined frame rate, resulting in the problem of frames being dropped during the recording of moving images.

SUMMARY OF THE INVENTION

It is an object of the present invention to provide an image signal processing apparatus, and a memory control method, which are capable of preventing the "simultaneous display of an original image and the immediately preceding image" as well as dropping of frames, and a program for implementing the method.

To attain the above object, in a first aspect of the present invention, there is provided an image signal processing apparatus comprising an image pickup device that outputs an image pickup signal corresponding to a subject, a signal processing circuit that subjects the image pickup signal outputted from the image pickup device to signal processing, a VRAM (Video Random Access Memory) section composed of at least three storage areas that store image signals outputted from the signal processing circuit, a VRAM management information section that stores management information indicative of storage states of the respective storage areas of the VRAM section, a compression circuit that subjects an image signal read from the VRAM section to compression processing, an image display processing circuit that subjects an image signal read from the VRAM section to image display processing, an image display section that displays images based on the image signal outputted from the image display processing circuit, and a memory controller that controls read/write operations for image signals in the respective storage areas of the VRAM section based on the management information stored in the VRAM management information section.

Preferably, after writing an image signal outputted from the signal processing circuit into one of the storage areas of the VRAM section has been completed, the memory controller refers to the VRAM management information section and selects, out of the storage areas, a storage area for which the compression process and the image display process are not required, as a storage area into which an image signal is to be written next.

Preferably, after writing an image signal outputted from the signal processing circuit into one of the storage areas of the VRAM section has been completed, the memory controller refers to the VRAM management information section and when there is no storage area for which the compression process and the image display process are not required in the VRAM section, dynamically adds a new storage area to the VRAM section and sets the dynamically added new storage area as a storage area into which an image signal is to be written next.

Preferably, the image signal processing apparatus further comprises a controller operable when a speed of reading from the VRAM section is lower than a speed of writing into the VRAM section, to raise a compression speed of the compression circuit.

Preferably, the image signal processing apparatus further comprises a controller operable when there is at least one storage area for which the compression process is yet to be carried out when reading of an image signal from the VRAM section to the compression circuit is completed, to raise a compression speed of the compression circuit.

Preferably, a series of numbers are assigned to the respective storage areas of the VRAM section, and the memory controller is operable when a number of one storage area of the VRAM section into which writing of an image signal outputted from the signal processing circuit has been completed is a final number in the series of numbers, to set a storage area assigned a first number in the series of numbers as a storage area to be written into next, and is operable when the number of the storage area into which the writing of the image signal has been completed is not a final number in the series of numbers, to set a storage area assigned a number obtained by incrementing the number of the storage area for which the writing has been completed as the storage area to be written into next.

Preferably, the image signal processing apparatus further comprises a controller operable when a number of storage areas of the VRAM section for which the compression process and the image display process are not required is below a predetermined number, to raise a compression speed of the compression circuit.

Preferably, the image signal processing apparatus further comprises a second controller operable when as a result of the compression speed being raised by the controller, there is no storage area for which the compression process needs to be carried out when reading of an image signal from the VRAM section to the compression circuit has been completed, to reduce the compression speed of the compression circuit to an original compression speed.

Preferably, the controller raises the compression speed by changing a compression ratio of the compression circuit or increasing a frequency of a clock signal supplied to the compression circuit.

To attain the above object, in a second aspect of the present invention, there is provided a memory control method applied to an image signal processing apparatus including a signal processing circuit that subjects an image pickup signal outputted from an image pickup device to signal processing, a VRAM section composed of at least three storage areas that store image signals outputted from the signal processing circuit, a compression circuit that subjects an image signal read from the VRAM section to compression processing, and an image display processing circuit that subjects an image signal read from the VRAM section to image display processing, the memory control method comprising a storage step of detecting storage states of the respective storage areas of the VRAM section and storing management information indicative of the storage states in a storage, and a memory control step of controlling read/write operations for image signals in the respective storage areas of the VRAM section based on the management information stored in the storage.

Preferably, after writing an image signal outputted from the signal processing circuit into one of the storage areas of the VRAM section has been completed, in the memory control step, the VRAM management information section is referred to, to select, out of the storage areas, a storage area for which the compression process and the image display process are not required, as a storage area into which an image signal is to be written next.

Preferably, after writing an image signal outputted from the signal processing circuit into one of the storage areas of the VRAM section has been completed, in the memory control step, the VRAM management information section is referred to, and when there is no storage area for which the compression process and the image display process are not required in the VRAM section, a new storage area is dynamically added to the VRAM section and the dynamically added new storage area is set as a storage area into which an image signal is to be written next.

Preferably, the memory control method further comprises a control step of raising a compression speed of the compression circuit when a speed of reading from the VRAM section is lower than a speed of writing into the VRAM section.

Preferably, the memory control method further comprises a control step of raising a compression speed of the compression circuit when there is at least one storage area for which the compression process is yet to be carried out when reading of an image signal from the VRAM section to the compression circuit is completed.

Preferably, a series of numbers are assigned to the respective storage areas of the VRAM section, in the memory control step, when a number of one storage area of the VRAM section into which writing of an image signal outputted from the signal processing circuit has been completed is a final number in the series of numbers, a storage area assigned a first number in the series of numbers is set as a storage area to be written into next, and when the number of the storage area into which the writing of the image signal has been completed is not a final number in the series of numbers, a storage area assigned a number obtained by incrementing the number of the storage area for which the writing has been completed is set as the storage area to be written into next.

Preferably, the memory control method further comprises a control step of raising a compression speed of the compression circuit when a number of storage areas of the VRAM section for which the compression process and the image display process are not required is below a predetermined number.

Preferably, the memory control method further comprises a second control step of reducing the compression speed of the compression circuit to an original compression speed when as a result of the compression speed being raised in the control step, there is no storage area for which the compression process needs to be carried out when reading of an image signal from the VRAM section to the compression circuit has been completed.

Preferably, the control step comprises raising the compression speed by changing a compression ratio of the compression circuit or increasing a frequency of a clock signal supplied to the compression circuit.

To attain the above object, in a third aspect of the present invention, there is provided a program for causing a computer to execute a memory control method applied to an image signal processing apparatus including a signal processing circuit that subjects an image pickup signal outputted from an image pickup device to signal processing, a VRAM section composed of at least three storage areas that store image signals outputted from the signal processing circuit, a compression circuit that subjects an image signal read from the VRAM section to compression processing, and an image display processing circuit that subjects the image signal read from the VRAM section to image display processing, the program comprising a storage module for detecting storage states of the respective storage areas of the VRAM section and storing management information indicative of the storage states in a storage, and a memory control module for controlling read/write operations for image signal in the respective storage areas of the VRAM section based on the management information stored in the storage.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail below with reference to the drawings showing preferred embodiments thereof.

Figure 1:
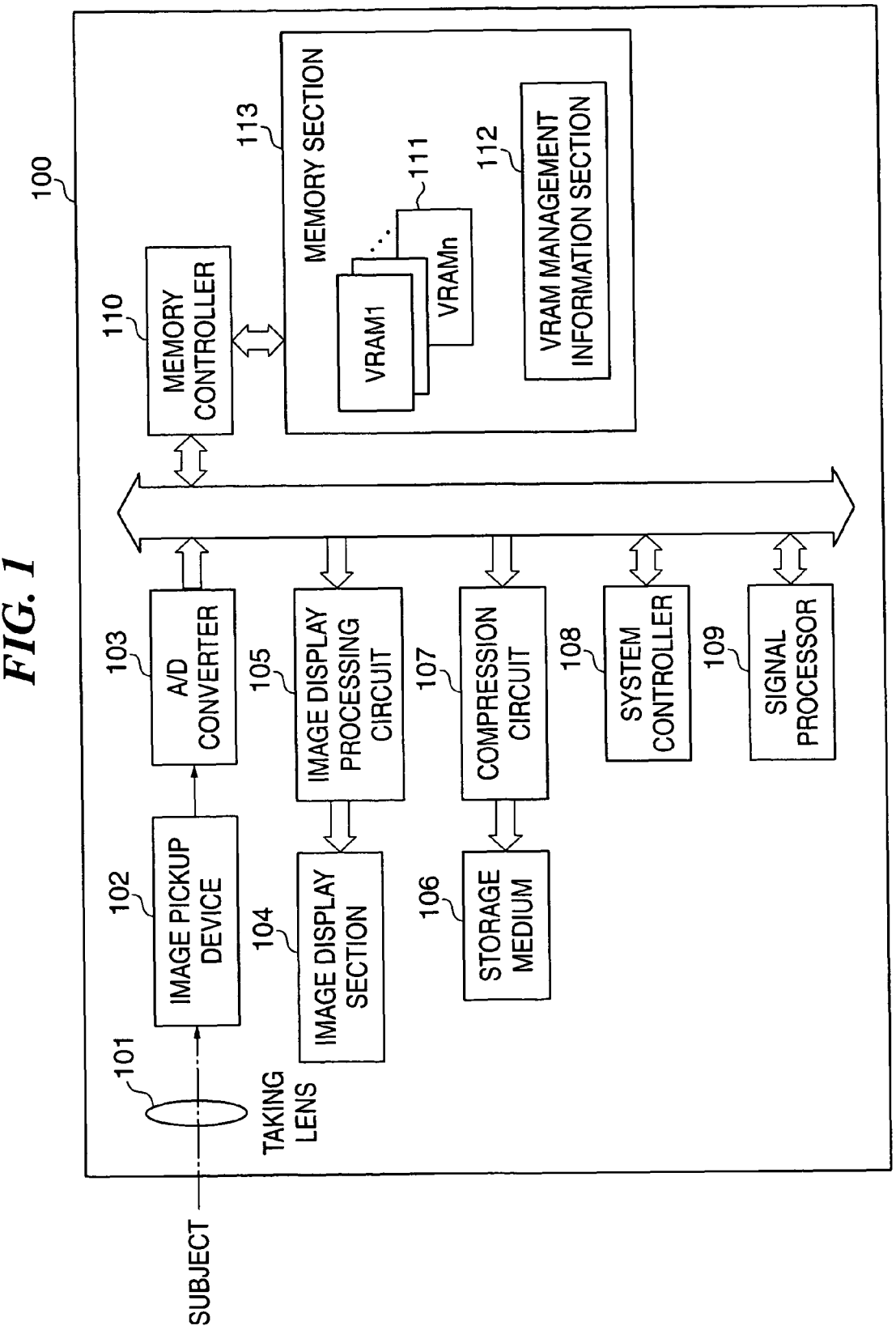
FIG. 1 is a block diagram showing the construction of an image signal processing apparatus according to a first embodiment of the present invention.

FIG. 1 is a block diagram showing the construction of an image signal processing apparatus according to a first embodiment of the present invention.

As shown in FIG. 1, then image signal processing apparatus 100 is comprised of taking lens 101, an image pickup device 102, an A/D converter 103, an image display section 104, an image display processing circuit 105, a storage medium 106, a compression circuit 107, a system controller 108, a signal processor 109, a memory controller 110, and a memory section 113. The memory section 113 includes a VRAM section 111, and a VRAM management information section 112.

The taking lens 101 takes in a subject image from a subject. The image pickup device 102 converts the subject image that is incident via the taking lens 101 into an electrical signal and outputs the electrical signal. The A/D converter 103 converts the analog electrical signal obtained from the image pickup device 102 into a digital electrical signal and outputs the digital electrical signal. The signal processor 109 subjects the output signal of the A/D converter 103 to various kinds of signal processing and then converts the resulting signal into an image signal composed of a luminance signal and a color difference signal.

The memory section 113 is a shared work memory means that is accessed by various sections via an internal bus and the memory controller 110. The VRAM section 111 in the memory section 113 is composed of a plurality of VRAM areas and is constructed of a DRAM that stores image signals. The number of VRAM areas of the VRAM section 111 can be increased when there is an insufficient number of VRAM areas. The VRAM areas are managed by being assigned the numbers 1 to n. Such numbers will be hereinafter referred to as "VRAM numbers".

Figure 2:
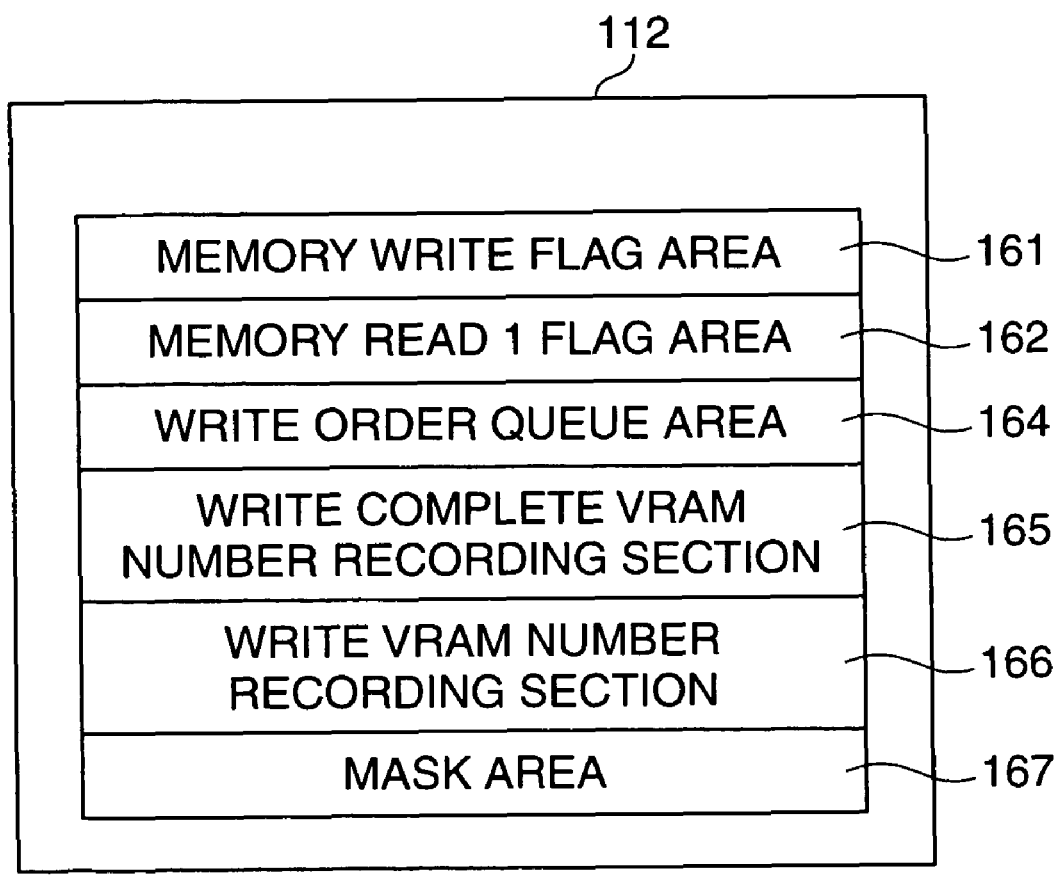
FIG. 2 is a diagram showing the structure of an internal memory of a VRAM management information section in a memory section.

FIG. 2 is a diagram showing the construction of an internal memory of the VRAM management information section 112 in the memory section 113.

In more detail, the VRAM management information section 112 is comprised of a memory write flag area 161, a memory read 1 flag area 162, a write order queue area 164, a write complete VRAM number recording section 165, a write VRAM number recording section 166, and a mask area 167.

In both the memory write flag area 161 and the memory read 1 flag area 162, flags corresponding to the VRAM areas are stored. For example, when the VRAM section 111 is composed of eight VRAM areas, eight flags are stored in the memory write flag area 161 and the memory read 1 flag area 162, respectively, with the respective flags corresponding to VRAM numbers 1 to 8.

Each of the stored in the memory write flag area 161 is raised (i.e., set to "1") when writing of an image signal into the corresponding VRAM area is completed, and is cleared (i.e., set to "0") when reading of an image signal to the compression circuit 107 from the corresponding VRAM area is completed. The state where a flag is raised in the memory write flag area 161 shows that writing of an image signal into the corresponding VRAM area has been completed but the image signal is yet to be compressed by the compression circuit 107, while the state where a flag is not raised in the memory write flag area 161 shows that writing into the corresponding VRAM area is presently possible.

Each of the flags stored in the memory read flag 1 area 162 is raised when reading of an image signal from the corresponding VRAM area to the image display processing circuit 105 starts and is cleared when the reading of the image signal is completed. The state where a flag is raised in the memory read 1 flag area 162 shows that reading of an image signal from the corresponding VRAM area to the image display processing circuit 105 is being carried out, while the state where a flag is not raised in the memory read 1 flag area 162 shows that reading of an image signal from the corresponding VRAM area to the image display processing circuit 105 is not being carried out.

Writing order for writing into the plurality of VRAM areas of the VRAM section 111 is stored in the write order queue area 164. The write complete VRAM number recording section 165 records the last VRAM number for which writing has been completed. The write VRAM number recording section 166 records the VRAM number into which writing is presently being carried out.

The mask area 167 is used for coping with two situations: a first situation where the image signal processing apparatus 100 is displaying images on the image display section 104 and simultaneously storing compressed images in the storage medium 106 via the compression circuit 107; and a second situation where the image signal processing apparatus 100 is only displaying images on the image display section 104. In more detail, flags corresponding to the VRAM areas are stored in the mask area 167 in the same way as in the memory write flag area 161 and the memory read 1 flag area 162. When the displaying of images by the image display section 104 and the storing of compressed images in the storage medium 106 via the compression circuit 107 are both being carried out, the flags corresponding to all of the VRAM areas are set to "1", while when only the displaying of images is being carried out, the flags corresponding to all of the VRAM areas are cleared, i.e. set to "0".

Referring again to FIG. 1, the memory controller 110 controls reading from and writing into the VRAM section 111 and the VRAM management information section 112. The image display section 104 is an image display device, such as a liquid crystal panel. The image display processing circuit 105 converts an image signal that has been subjected to image processing into a signal format of the image display section 104 and outputs the image signal to the image display section 104. The compression circuit 107 carries out a compression encoding process on an image signal. The image signal to be compressed is obtained by reading from the VRAM section 111 via the memory controller 110. The image signal compressed by the compression circuit 107 is stored in the storage medium 106. The system controller 108 includes a CPU, a ROM, and a RAM, and controls the entire image signal processing apparatus 100.

Note that "W", "R1", and "R2" used in the following description are defined as follows.

"W" indicates writing of an image signal outputted from the signal processor 109 into the VRAM section 111, "R1" indicates reading of an image signal from the VRAM section 111 to the image display processing circuit 105, and "R2" indicates reading of an image signal from the VRAM section 111 to the compression circuit 107.

Note that in the present embodiment, the processing rates of W and R1 are fixed values, and the processing rate of R2 is variable but has a higher average value than W.

Figure 3:
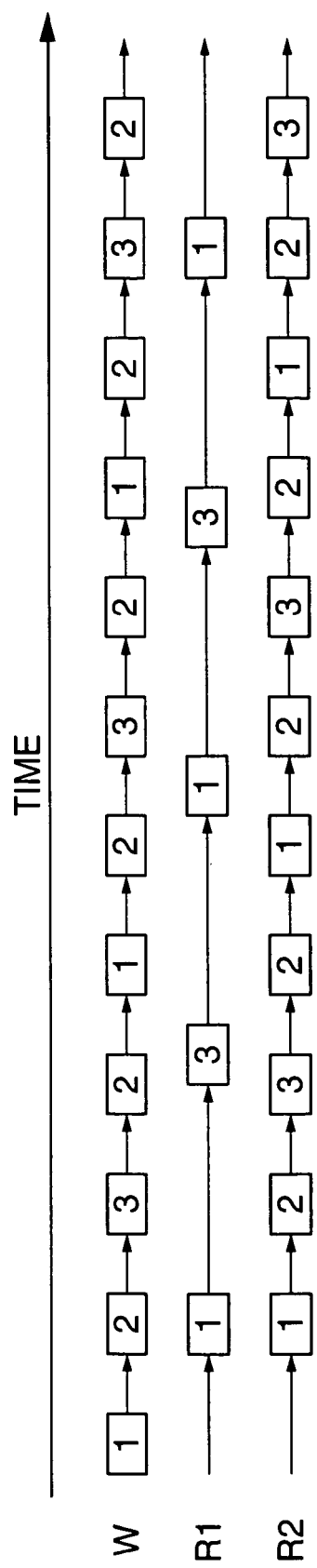
FIG. 3 is a diagram showing how VRAM processed by W, R1, and R2 change over time in the case where a processing rate of R2 is fixed.

FIG. 3 is a diagram showing how the VRAM areas processed by W, R1, and R2 change over time in the case where the processing rate of R2 is assumed to be fixed. In this example, it is assumed that the VRAM section 111 is composed of three VRAM sections, with the blocks in FIG. 3 showing VRAM areas and the numbers inside the blocks indicating VRAM numbers.

Figure 4:
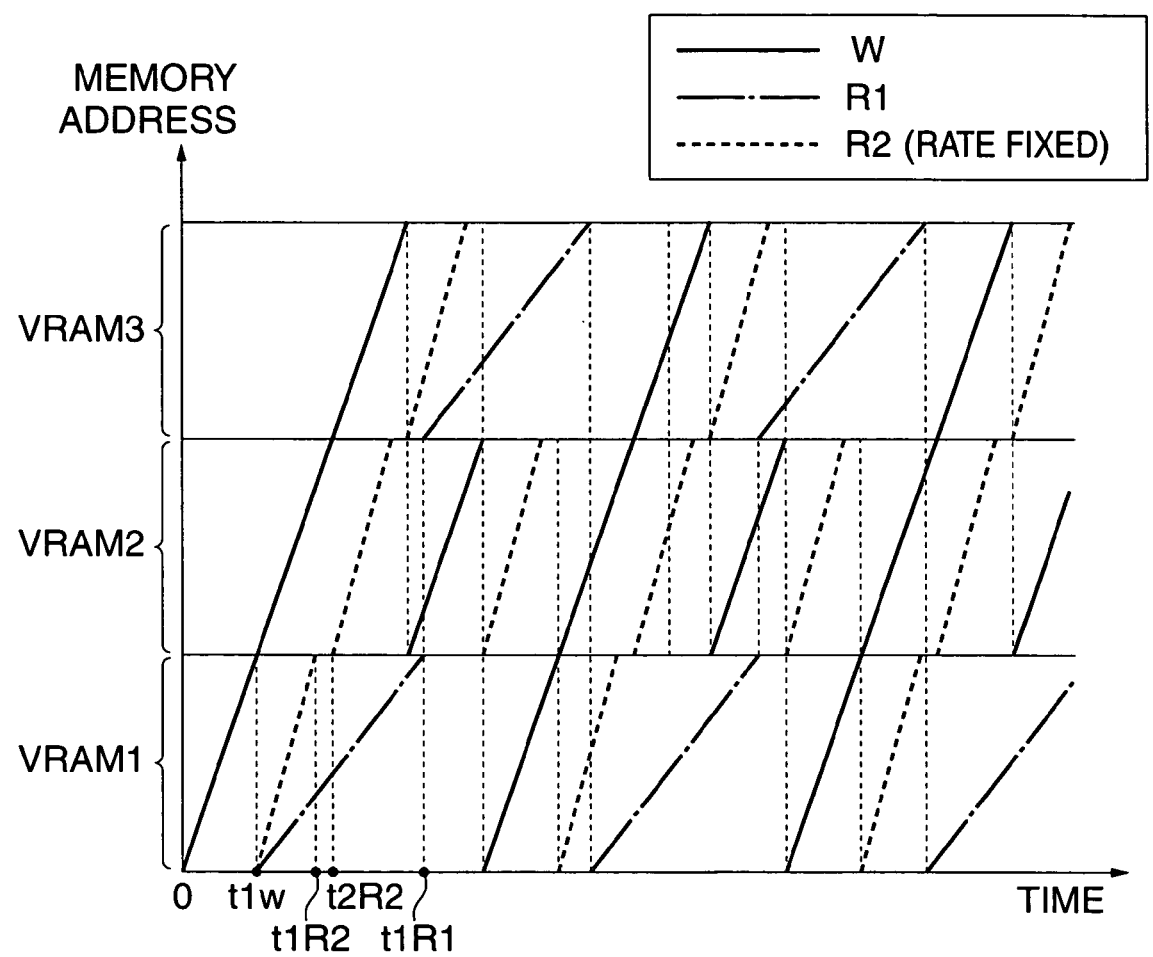
FIG. 4 is a graph showing processing states of W, R1, and R2 in the three VRAM areas appearing in FIG. 3.

FIG. 4 is a graph showing the processing states of W, R1, and R2 for the three VRAM areas shown in FIG. 3. The abscissa shows time, while the ordinate shows memory addresses of the respective VRAM areas.

Figure 5:
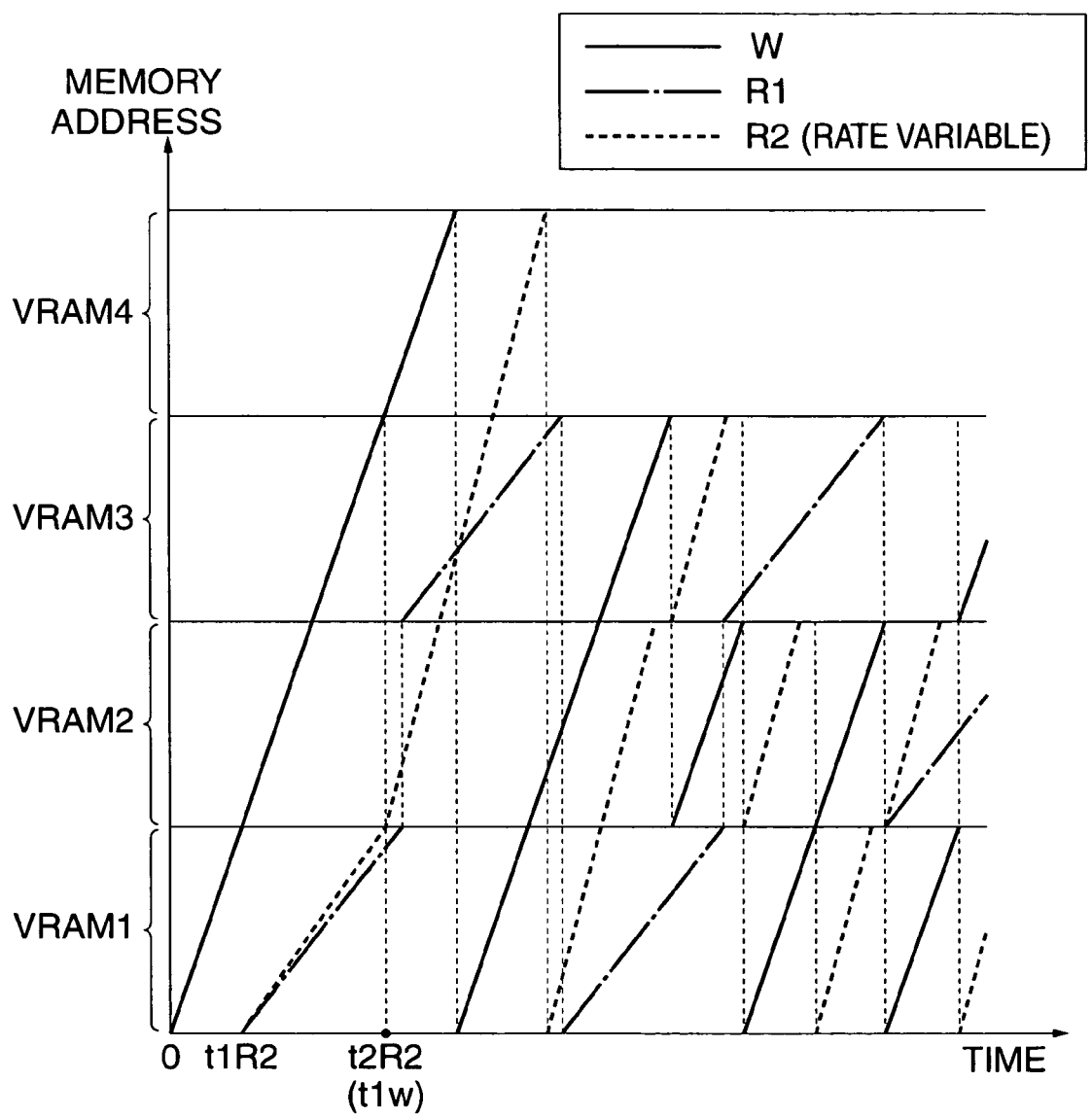
FIG. 5 is a graph showing the processing states of W, R1, and R2 when the processing rate of R2 varies.

FIG. 5 is a graph showing the processing states of W, R1, and R2 in the case where the processing rate of R2 fluctuates. The abscissa shows time, while the ordinate shows memory addresses of the respective VRAM areas. Note that in the example shown in FIG. 5, the VRAM section 111 is initially composed of three VRAM areas but a new VRAM area with the VRAM number 4 is subsequently added.

Note that FIGS. 3 to 5 illustrate an example case where the respective write and read frame rates are 80 fps for W, 30 fps for R1, and 100 fps for R2.

In the present embodiment, control is carried out by a VRAM write/read process, described later with reference to FIGS. 6 to 9, so that, as shown in FIGS. 4 and 5, the solid lines representing W (writing) and the two types of broken lines representing R1 and R2 (reading) do not intersect. This prevents reading of an image signal being updated while another image signal is being written into a VRAM area, and also prevents updating of an image signal while another image signal is being read from a VRAM area, so that the "simultaneous display of an original image and the immediately preceding image" does not occur. As explained before, the expression "simultaneous display of an original image and the immediately preceding image" refers to a phenomenon where images picked up at different times are read out to be displayed respectively at upper and lower parts of a screen due to reading of an image signal "overtaking" from a VRAM writing of another image signal into the VRAM during the writing of the latter signal into the VRAM or due to writing of an image signal into a VRAM "overtaking" reading of another image signal from the VRAM during the reading of the latter signal from the VRAM.

Figure 6:
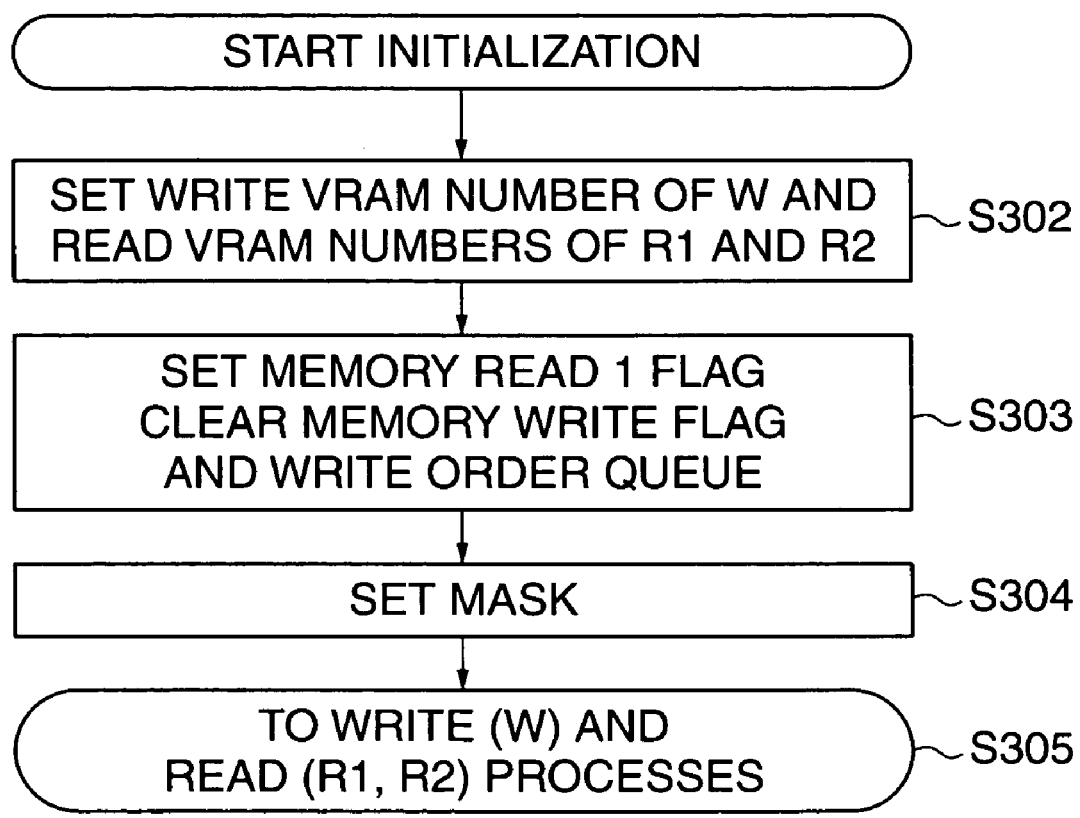
FIG. 6 is a flowchart showing the procedure of an initialization process, as a part of a VRAM write/read process executed by the image signal processing apparatus.

FIG. 6 is a flowchart showing the procedure of an initialization as a part of the VRAM write/read process executed by the image signal processing apparatus 100. Note that the VRAM write/read process is carried out in the system controller 108 by the CPU executing a control program stored in the ROM. The VRAM write/read process will now be described with reference to this flowchart.

The system controller 108 sets a VRAM number (the number of a VRAM to be written by W) to be recorded in the write VRAM number recording section 166 of the VRAM management information section 112 and a VRAM number of a VRAM area to be read by R1 and R2 to "1" (step S302).

Next, the flag corresponding to the VRAM number 1 in the memory read 1 flag area 162 is raised and the memory write flag area 161 and the write order queue area 164 are cleared (step S303).

When both the displaying of images by the image display section 104 and the storing of compressed images in the storage medium 106 via the compression circuit 107 are carried out by the image signal processing apparatus 100, the flags in the mask area 167 corresponding to all of the VRAM areas are set to "1", while when only the displaying of images by the image display section 104 is carried out, the flags in the mask area 167 corresponding to all of the VRAM areas are set to "0" (step S304).

Next, the respective read/write processes for W, R1, and R2 are started (step S305).

Figure 7:
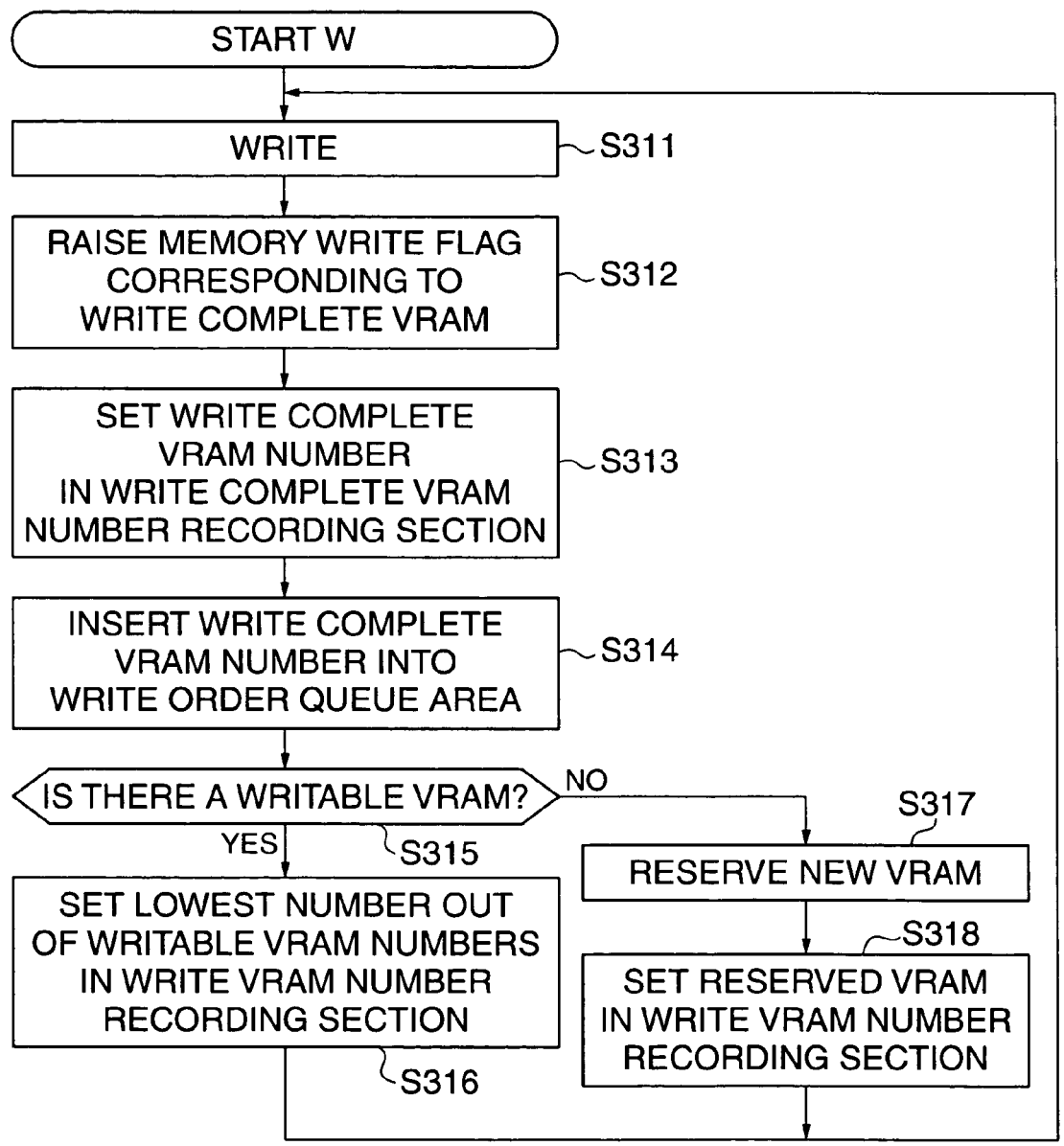
FIG. 7 is a flowchart showing the procedure of a W process (that is, writing of an image signal outputted from a signal processing section into a VRAM section) out of the VRAM write/read process executed by the image signal processing apparatus.

FIG. 7 is a flowchart showing the procedure of a W process (that is, writing of an image signal outputted from the signal processor 109 into the VRAM section 111) as a part of the VRAM write/read process executed by the image signal processing apparatus 100.

An image signal is written into a VRAM area corresponding to the VRAM number recorded into the write VRAM number recording section 166 of the VRAM management information section 112 (step S311). When the writing is completed, the flag corresponding to the VRAM area for which writing has been completed is raised (step S312), the VRAM number of the VRAM for which writing has been completed is recorded in the write complete VRAM number recording section 165 (step S313), and the VRAM number is also recorded at the end of the write order queue area 164 (step S314).

Next, it is determined whether a writable VRAM area is present in the VRAM section 111 (step S315). That is, for each VRAM area, a logical AND of the value of the flag recorded in the memory write flag area 161 and the value of the flag recorded in the mask area 167 is determined, and a logical OR is then determined from the determined logical AND and the value of the flag recorded in the memory read 1 flag area 162, and it is determined whether there is a VRAM area for which the result of the logical OR is "0". If there is a VRAM area where the result is "0", the process proceeds to a step S316, or if there is no such area, the process proceeds to a step S317.

In the step S316, when there are a plurality of writable VRAM areas, one VRAM area is selected from the writable VRAM areas. For example, the VRAM area with the lowest VRAM number is selected out of the plurality of writable VRAM areas. After this, the process returns to the step S311.

In the step S317, since there is no writable VRAM area, a new VRAM area is reserved in the VRAM section 111, and then in the next step S318, the VRAM number of the reserved new VRAM area is recorded in the write VRAM number recording section 166 as the VRAM area to be written next.

Figure 8:
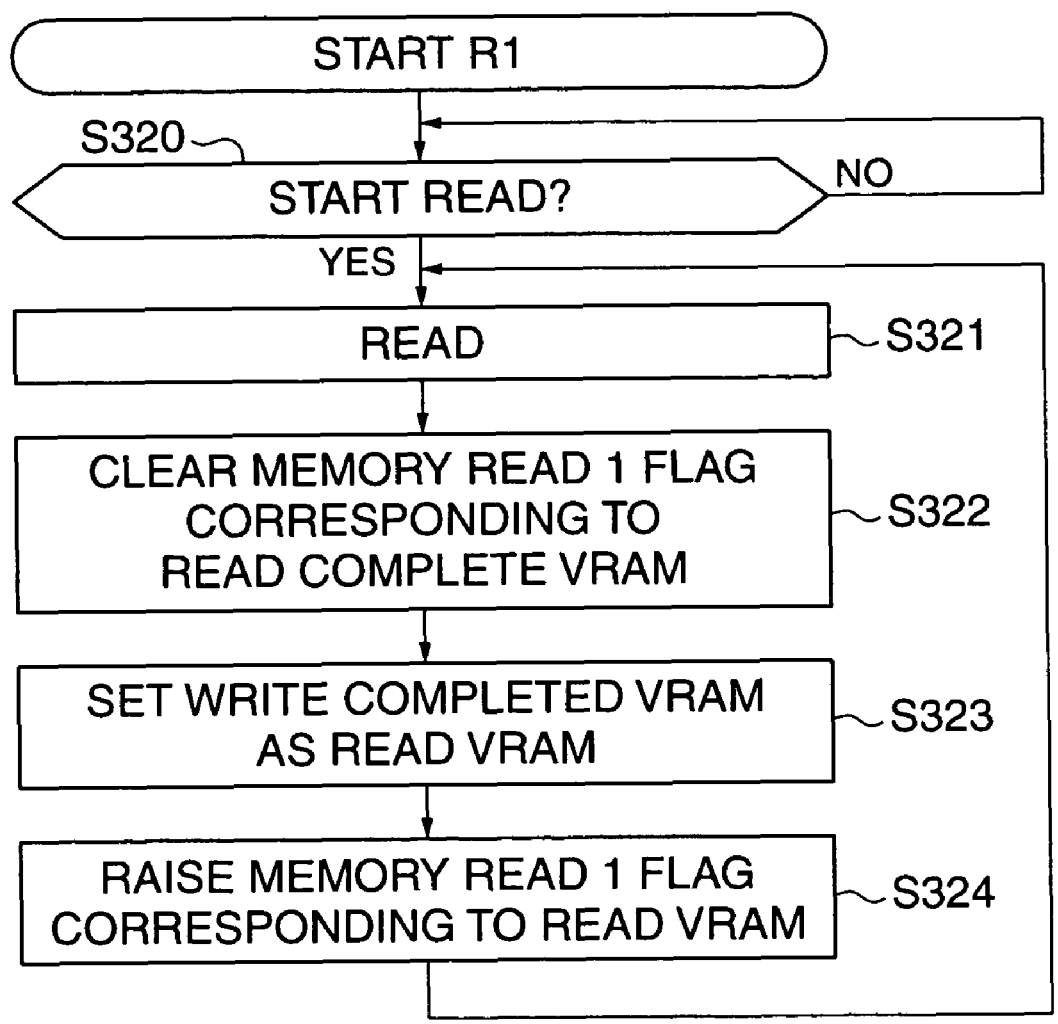
FIG. 8 is a flowchart showing the procedure of an R1 process (that is, reading of an image signal from the VRAM section into an image display processing circuit) out of the VRAM write/read process executed by the image signal processing apparatus.

FIG. 8 is a flowchart showing the procedure of a R1 process (that is, reading of an image signal from the VRAM section 111 into the image display processing circuit 105) as a part of the VRAM write/read process executed by the image signal processing apparatus 100.

First, the process stands by without starting reading until a VRAM number is recorded in the write complete VRAM number recording section 165 (step S320). When a VRAM number is recorded in the write complete VRAM number recording section 165, the process proceeds to a step S321, where reading of an image signal from the VRAM area with the recorded VRAM number to the image display processing circuit 105 is started.

When the reading of the image signal has been completed, the flag in the memory read 1 flag area 162 corresponding to the VRAM area for which the reading has been completed is cleared (step S322).

Next, a VRAM area whose VRAM number is next to the VRAM number recorded in the write complete VRAM number recording section 165 is set as the VRAM area to be read next (step S323), and the flag in the memory read 1 flag area 162 that corresponds to the set VRAM area is raised (step S324). After this, the process returns to the step S321, and another reading is started.

Note that when the processing rate of R1 is slower than that of W, in the step S323, a VRAM area with the VRAM number recorded in the write VRAM number recording section 166 may be set as the VRAM area to be read next. Also, even when the processing rate of R1 is faster than that of W, so long as R1 will not catch up with W when reading is started from a VRAM area with the VRAM number recorded in the write VRAM number recording section 166, the VRAM area with the VRAM number recorded in the write VRAM number recording section 166 may be set as the VRAM area to be read next.

Figure 9:
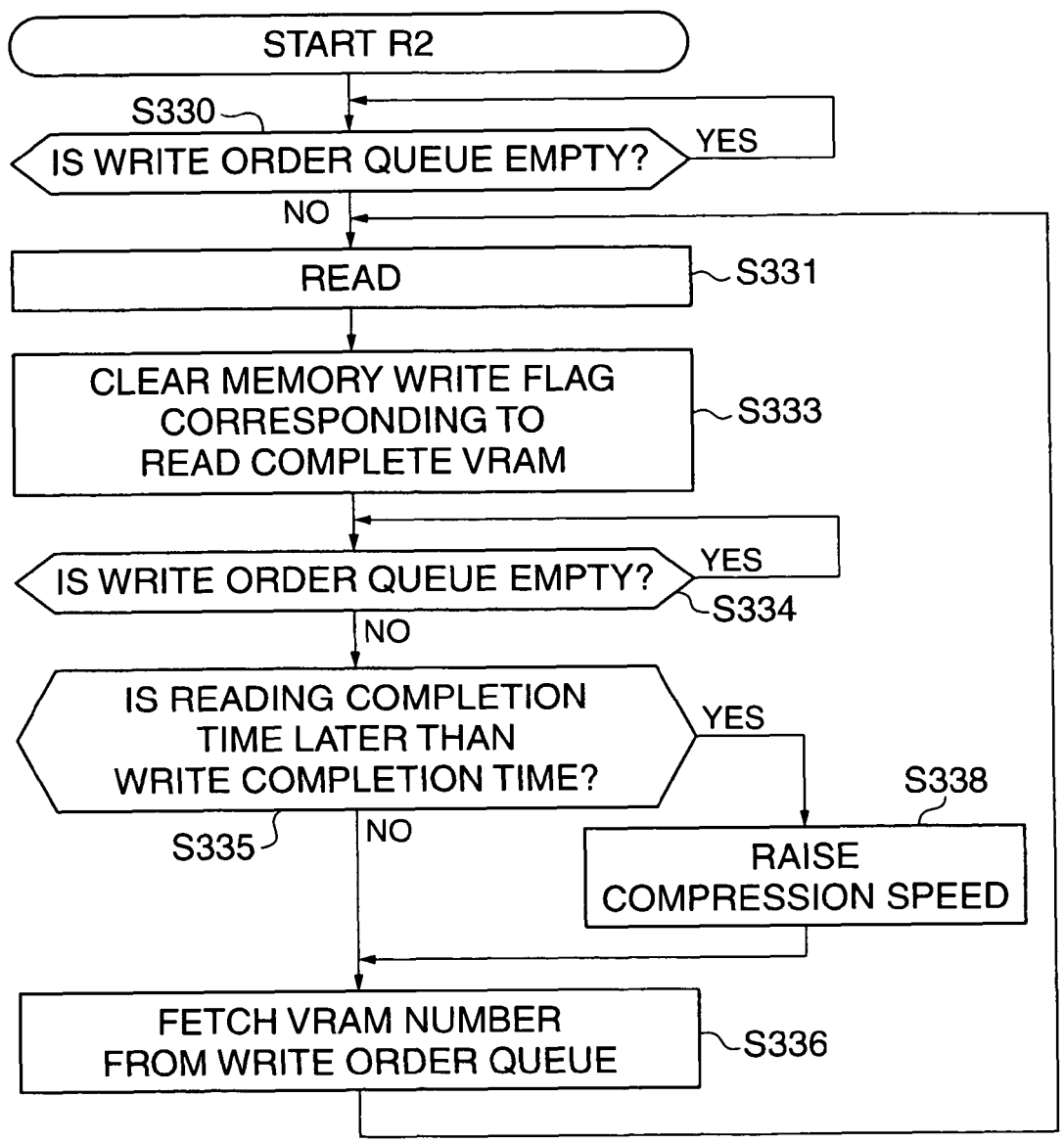
FIG. 9 is a flowchart showing the procedure of a R2 process (that is, reading of an image signal from the VRAM section into a compression circuit) out of the VRAM write/read process executed by the image signal processing apparatus.

FIG. 9 is a flowchart showing the procedure of a R2 process (that is, reading of an image signal from the VRAM section 111 into the compression circuit 107) as a part of the VRAM write/read process executed by the image signal processing apparatus 100.

The process stands by until the VRAM number of a VRAM for which writing has been completed is recorded in the write order queue area 164 (step S330), and when the VRAM number has been recorded, the process proceeds to a step S331 where reading of an image signal from a VRAM area with the VRAM number written at a first position in the write order queue area 164 is started. When the reading has been completed, the flag in the memory write flag area 161 corresponding to the VRAM area for which the read has been completed is cleared (step S333).

Next, it is checked whether or not the write order queue area 164 is empty (step S334). If it is empty, since there is no image signal to be read, no reading is started and the process stands by without starting reading while polling until a VRAM number is recorded in the write order queue area 164 ("YES" to the step S334).

If the write order queue area 164 is not empty, the process proceeds to a step S335 where it is determined whether reading completion time of the reading carried out in the step S331 (this time is delayed when the compression process on the image signal is time-consuming) was later than writing completion time of W for the immediately preceding frame. If the reading completion time is later, one more storage area to be subjected to the compression process will remain at reading completion time of R2, and accordingly the process proceeds to a step S338 to expedite the compression process. When the reading completion time is not later, the process proceeds to a step S336.

In the step S338, the compression speed is increased such as by changing values in a quantization table of the compression circuit 107 to raise the compression ratio and/or by increasing the frequency of a clock signal supplied to the compression circuit 107.

In the step S336, the VRAM number written in the first position of the write order queue area 164 is fetched and the VRAM area with this VRAM number is set as the VRAM area to be read by R2 next. The process then returns to the step S331.

Next, the VRAM write/read process described above will be described in more detail with reference to the example of the processing states of W, R1, and R2 shown in FIGS. 4 and 5.

First, the process will be described in order of time with reference to FIG. 4 that shows one example of the processing states of W, R1, and R2 in the case where the compression speed of R2 does not change.

As the initialization process, the VRAM number 1 is recorded into the write VRAM number recording section 166 and the VRAM number of the VRAM area to be subjected to the reading processes R1 and R2 is set to "1" (the step S302). Next, the flag in the memory read 1 flag area 162 corresponding to the VRAM area with the VRAM number 1 is raised (i.e., the flag is set to "1"), the flags in the memory write flag area 161 corresponding to all of the VRAM areas are cleared (i.e., the flags are set to "0"), and any VRAM numbers written in the write order queue area 164 are cleared (the step S303). In the example shown in FIG. 4, since the image signal processing apparatus 100 carries out both the displaying of images on the image display section 104 and the storing of compressed images in the storage medium 106 via the compression circuit 107, the flags in the mask area 167 corresponding to all of the VRAM areas are set to "1" (the step S304).

At time "0" shown in FIG. 4, writing of an image signal by W into the VRAM area with the VRAM number 1 is started (the step S311).

At time "tlw", the writing into the VRAM area with the VRAM number 1 by W is completed and at this time, the VRAM number 1 is recorded in the write complete VRAM number recording section 165 (the step S313) and the VRAM number 1 is recorded in the write order queue area 164 (the step S314). At this time, for each VRAM area, a logical OR of a logical AND of the value of the flag recorded in the memory write flag area 161 and the value of the flag recorded in the mask area 167 and the value of the flag recorded in the memory read 1 flag area 162 is determined (the step S315), and the resulting logical sum values corresponding to the VRAM numbers 2 and 3 are "0", and thus the VRAM area with the lower VRAM number, i.e., the VRAM number 2, is selected for writing by W and the VRAM number 2 is recorded in the write VRAM number recording section 166 to update the VRAM number recorded therein (the step S316).

Since at time "tlw", the VRAM number 1 was recorded in the write complete VRAM number recording section 165 in the step S313, reading from the VRAM area with the VRAM number 1 by R1 is started (the step S321). In addition, since the VRAM number 1 was recorded in the write order queue area 164 in the step S313, reading from the VRAM area with the VRAM number 1 recorded in the write order queue area 164 by R2 is started (the steps S330 and S331). Note that in accordance with the start of the reading, the content of the write order queue area 164 is cleared.

At time "tlR2", the reading from the VRAM area with the VRAM number 1 by R2 is completed. At this time, the write order queue area 164 is empty, so the reading by R2 is waited until time "t2R2.".

At time "t1R1", the reading from the VRAM area with the VRAM number 1 by R1 is completed, and thus the flag in the memory read 1 flag area 162 corresponding to the VRAM number 1 is cleared (the step S322). At this time, the VRAM number 3 has been recorded in the write complete VRAM number recording section 165, and the VRAM number 3 is set as the number of a VRAM area to be read next by R1 (the step S323), the flag in the memory read 1 flag area 162 corresponding to the VRAM number 3 is raised (the step S324), and another reading is carried out.

After this, as the VRAM write/read process proceeds according to the flowcharts shown in FIGS. 6 to 9, the operation shown in FIG. 4 is carried out.

Next, the VRAM write/read process will be described in order of time with reference to FIG. 5 that shows one example of the processing states of W, R1, and R2 in the case where the compression speed of R2 changes.

At time "tlR2" shown in FIG. 5, reading from the VRAM area with the VRAM number 1 by R2 is started (the step S331), but the compression of this frame is time-consuming and is finally completed at time "t2R2".

At time "t1w", writing into the VRAM area with the VRAM number 3 by W is completed, and therefore, for each VRAM area, a logical OR of a logical AND of the value of the flag recorded in the memory write flag area 161 and the value of the flag recorded in the mask area 167 is determined, and the value of the flag recorded in the memory read 1 flag area 162 is determined. The resulting logical sum values corresponding to the VRAM numbers 1, 2 and 3 are all "1", and therefore the VRAM number 4 is newly reserved (the step S317), and the VRAM number 4 is registered in the write VRAM number recording section 166 (the step S318).

After this, as the VRAM write/read process proceeds according to the flowcharts shown in FIGS. 6 to 9, the operation shown in FIG. 5 is carried out.

The above description is based on the premise that the displaying of images by the image display section 104 and the storage of compressed images in the storage medium 106 via the compression circuit 107 are carried out simultaneously or in parallel in the image signal processing apparatus 100, but when only the displaying of images by the image display section 104 is carried out, in the step S304 in FIG. 6, processing may be carried out according to the flowcharts shown in FIGS. 7 to 9 after the flags in the mask area 167 corresponding to all of the VRAM areas have been set to "0". In addition, to transit from a state where the displaying of images by the image display section 104 and the storage of compressed images in the storage medium 106 via the compression circuit 107 are carried out simultaneously to a state where only the displaying of images by the image display section 104 is carried out, the flags in the memory write flag area 161 corresponding to all of the VRAM areas may be cleared and then the process may be started from the initialization process shown in FIG. 6.

The above description is further based on the premise that the number of VRAM areas inside the VRAM section 111 can be changed, but since the case where the number of VRAM areas is fixed corresponds to the case where the compression process is time-consuming, if the time taken by the compression process is reduced by raising the compression ratio in accordance with steps S335 and S338 in FIG. 9, the write order queue area 164 can be prevented from becoming full of VRAM numbers corresponding to image signals that are waiting to be subjected to the compression process.

Next, a second embodiment of the present invention will be described.

The construction of the second embodiment is fundamentally the same as the construction of the first embodiment, and therefore in the description of the second embodiment, elements and parts with the same construction as in the first embodiment are designated by identical reference numerals, description thereof is omitted, and only different elements and parts will be described.

The second embodiment is comprised of a memory section 113a, a VRAM section 111a, and a VRAM management information section 112a in place of the memory section 113, the VRAM section 111, and the VRAM management information section 112 of the first embodiment shown in FIG. 1. The VRAM section 111a includes a predetermined number of VRAM areas. This number is not increased or decreased.

Figure 10:
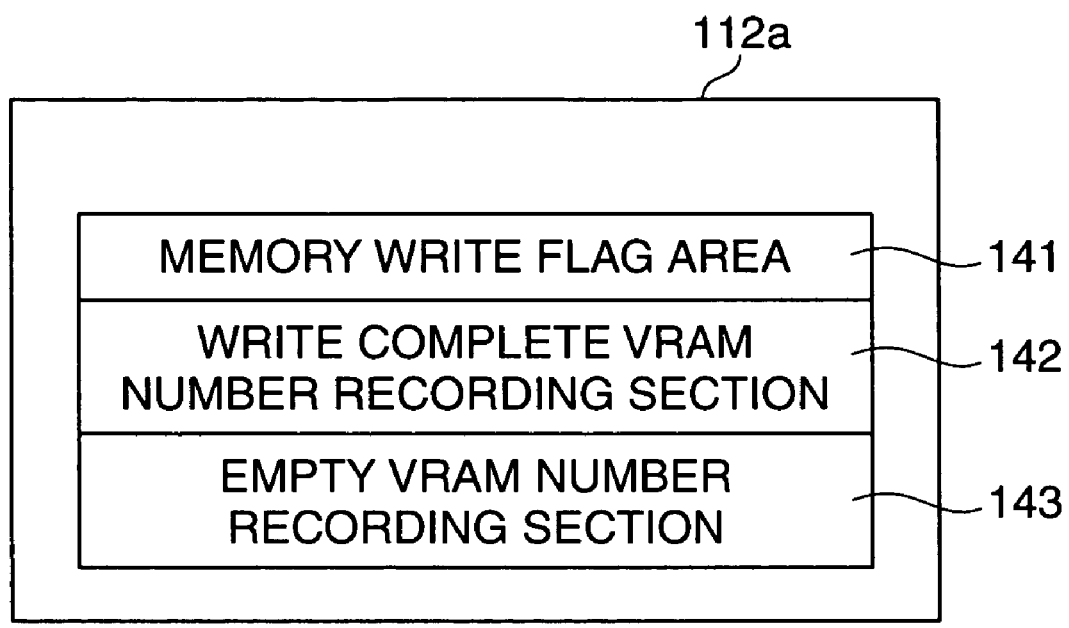
FIG. 10 is a diagram showing the structure of an internal memory of a VRAM management information section in a second embodiment of the present invention.

FIG. 10 is a diagram showing the structure of an internal memory of the VRAM management information section 112a in the second embodiment.

That is, the VRAM management information section 112a is comprised of a memory write flag area 141, a write complete VRAM number recording section 142, and an empty VRAM number recording section 143.

In the memory write flag area 141, a plurality of flags corresponding respectively to the plurality of VRAM areas of the VRAM section 111a are stored in the same way as in the memory write flag area 161 of the first embodiment, with such flags being raised (i.e., set to "1") when writing of an image signal into the corresponding VRAM area is completed and cleared (i.e., set to "0") when reading of an image signal to the compression circuit 107 from the corresponding VRAM area is completed.

In the write complete VRAM number recording section 142, the last VRAM number for which writing has been completed is recorded.

The empty VRAM number recording section 143 records the number of VRAM areas that are presently empty. This number is decremented whenever writing into one VRAM area is completed and is incremented whenever reading from one VRAM area to the compression circuit 107 is completed.

Figure 11:
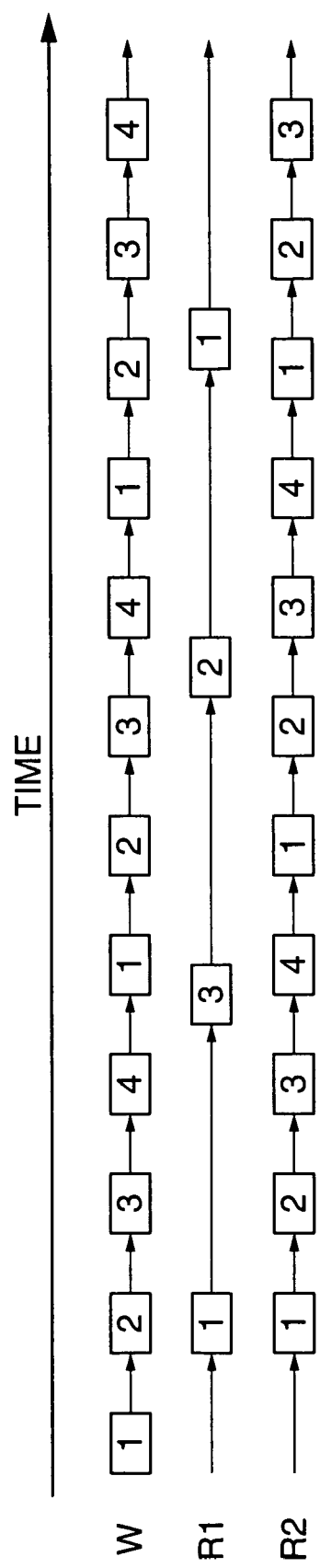
FIG. 11 is a diagram showing how the VRAM areas processed by W, R1, and R2 change over time in the second embodiment.

FIG. 11 is a diagram showing how the VRAM areas processed by W, R1, and R2 change over time in the second embodiment. In this example, the VRAM section 111*a* is composed of four VRAM sections, with the blocks in FIG. 11 showing VRAM areas and the numbers inside the blocks indicating VRAM numbers.

Figure 12:
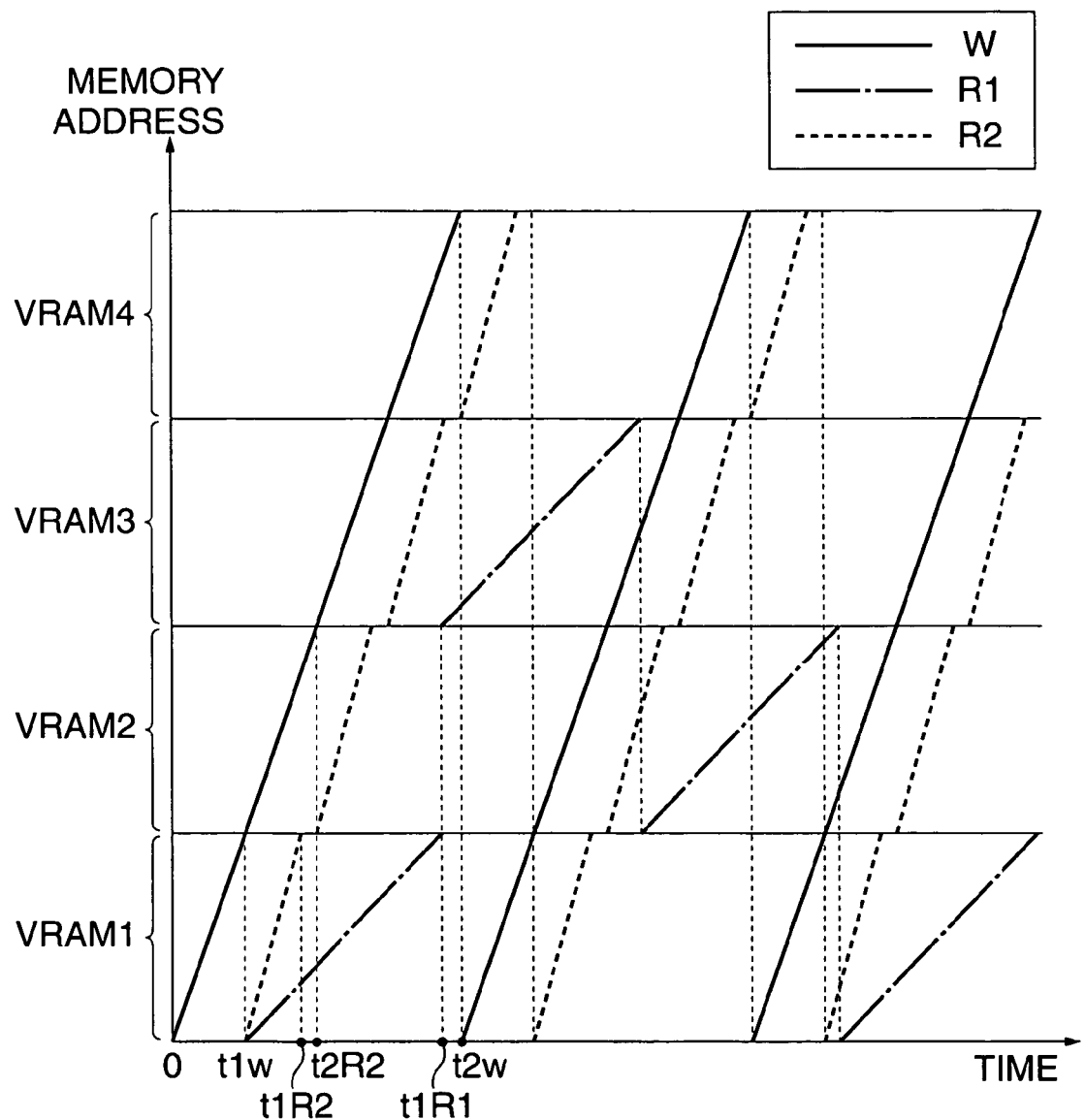
FIG. 12 is a graph showing processing states of W, R1, and R2 in the four VRAM areas appearing in FIG. 11.

FIG. 12 is a graph showing the processing states of W, R1, and R2 in the four VRAM areas shown in FIG. 11. The abscissa shows time, while the ordinate shows memory addresses of the respective VRAM areas.

Note that FIGS. 11 to 12 illustrate the case where the respective write and read frame rates are 80 fps for W, 30 fps for R1, and 100 fps for R2.

In the second embodiment, control is carried out by a VRAM write/read process, described later with reference to FIGS. 13 to 16, so that, as shown in FIG. 12, the solid lines representing W (writing) and the two types of broken lines representing R1 and R2 (reading) do not intersect. This prevents reading of an image signal being updated while another image signal is being written into a VRAM area, and also prevents updating of an image signal while another image signal is being read from a VRAM area, so that the "simultaneous display of an original image and the immediately preceding image", mentioned before, does not occur.

Figure 13:
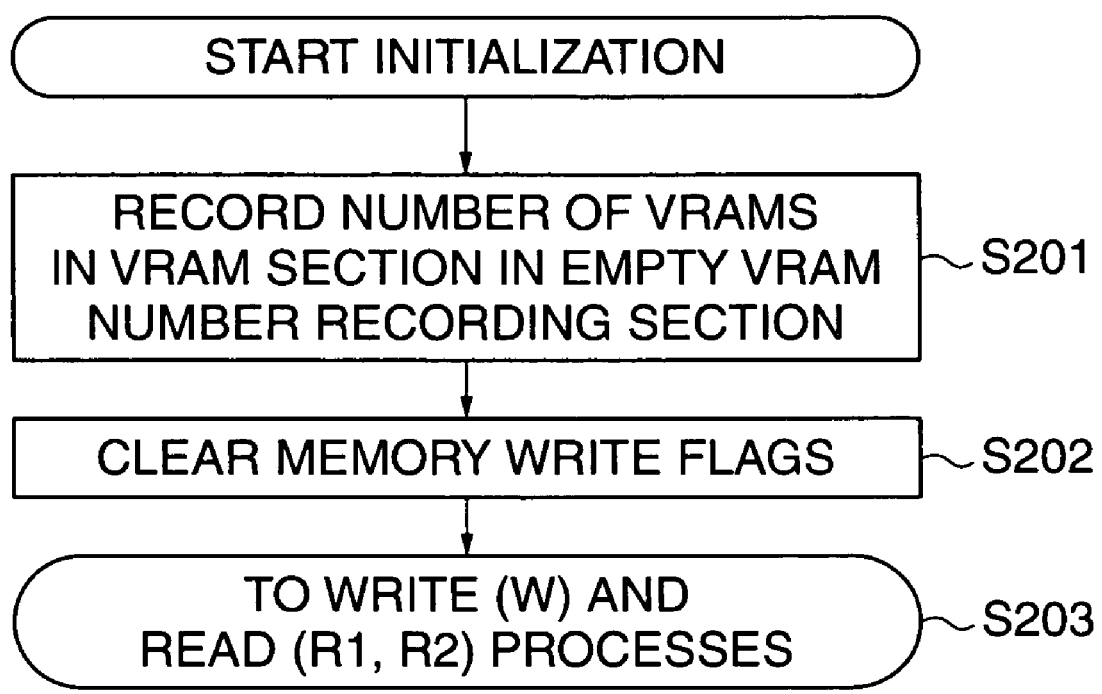
FIG. 13 is a flowchart showing the procedure of an initialization as a part of a VRAM write/read process executed by an image signal processing apparatus according to the second embodiment.

FIG. 13 is a flowchart showing the procedure of an initialization as a part of the VRAM write/read process executed by the image signal processing apparatus 100 according to the second embodiment.

First, the system controller 108 records the number of VRAM areas inside the VRAM section 111*a* in the empty VRAM number recording section 143 (step S201). Also, four flags in the memory write flag area 141 corresponding to the four VRAM areas of the VRAM section 111*a* are cleared (set to "0") (step S202).

Next, the respective read/write processes for W, R1, and R2 are started (step S203).

Figure 14:
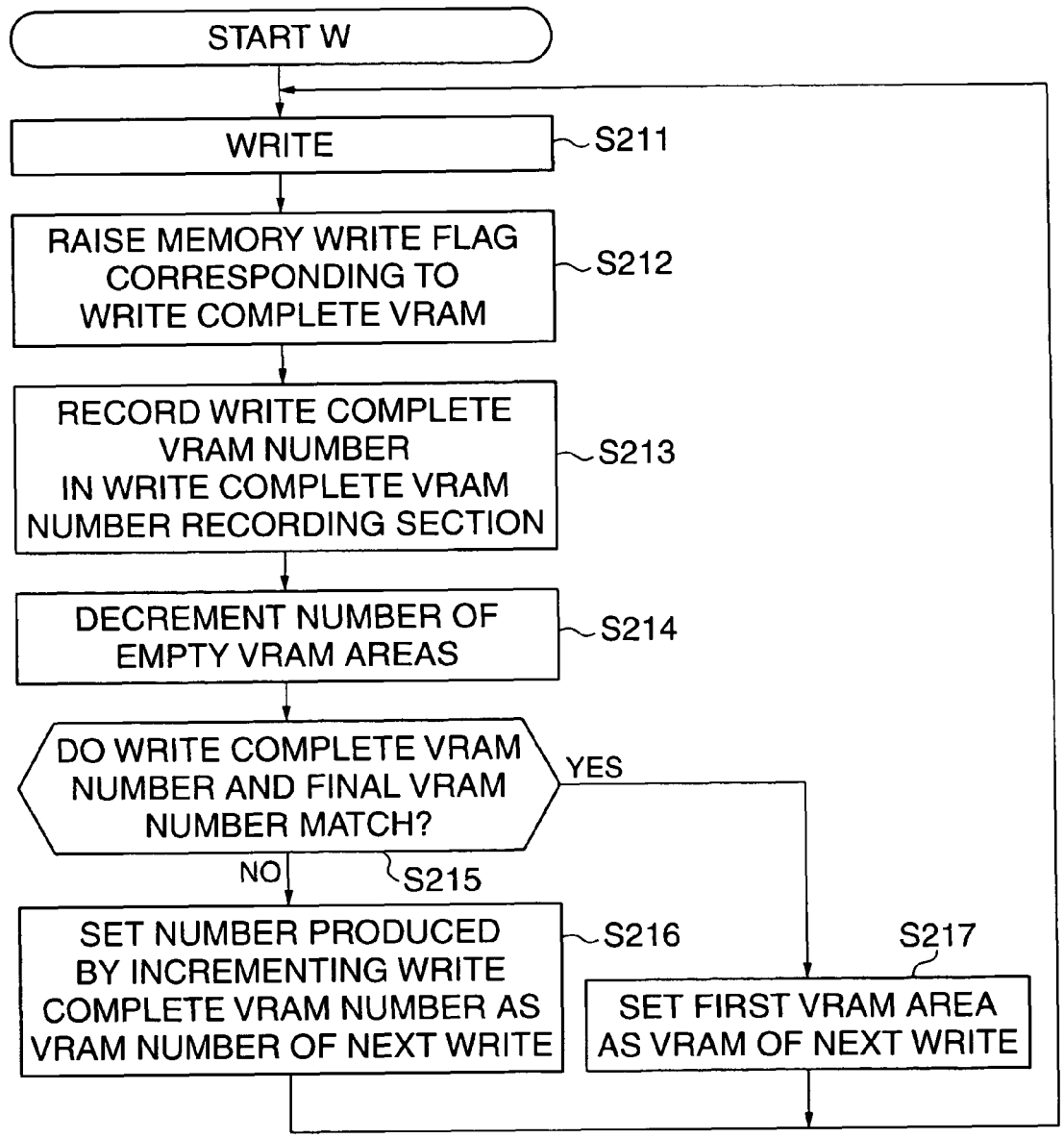
FIG. 14 is a flowchart showing the procedure of a W as a part of the VRAM write/read process executed by the image signal processing apparatus according to the second embodiment.

FIG. 14 is a flowchart showing the procedure of a W process (that is, writing of an image signal outputted from the signal processor 109 into the VRAM section 111*a*) as a part of the VRAM write/read process executed by the image signal processing apparatus 100 according to the second embodiment.

An image signal is written into a set VRAM area (when the present process is carried out for the first time, the VRAM corresponding to the VRAM number 1) (step S211). When the writing is completed, the flag in the memory write flag area 141 corresponding to the VRAM area for which the writing has been completed is raised (i.e., set to "1") (step S212), and the VRAM number of the VRAM area for which the writing has been completed is registered in the write complete VRAM number recording section 142 (step S213). Since the number of empty VRAM areas falls by one due to the writing, the number of empty VRAM areas in the empty VRAM number recording section 143 is decremented (step S214).

It is then determined whether the VRAM number registered in the write complete VRAM number recording section 142 matches the final VRAM number (4) (step S215). If the numbers match, the process proceeds to a step S217, or if the numbers do not match, the process proceeds to a step S216.

In the step S217, the VRAM area with the first number (1) is set as the VRAM area to be written next and the process returns to the step S211.

In the step S216, the VRAM area with a VRAM number produced by incrementing the VRAM number of the VRAM area for which the writing has been completed is set as the VRAM area to be written next and the process returns to the step S211.

Figure 15:
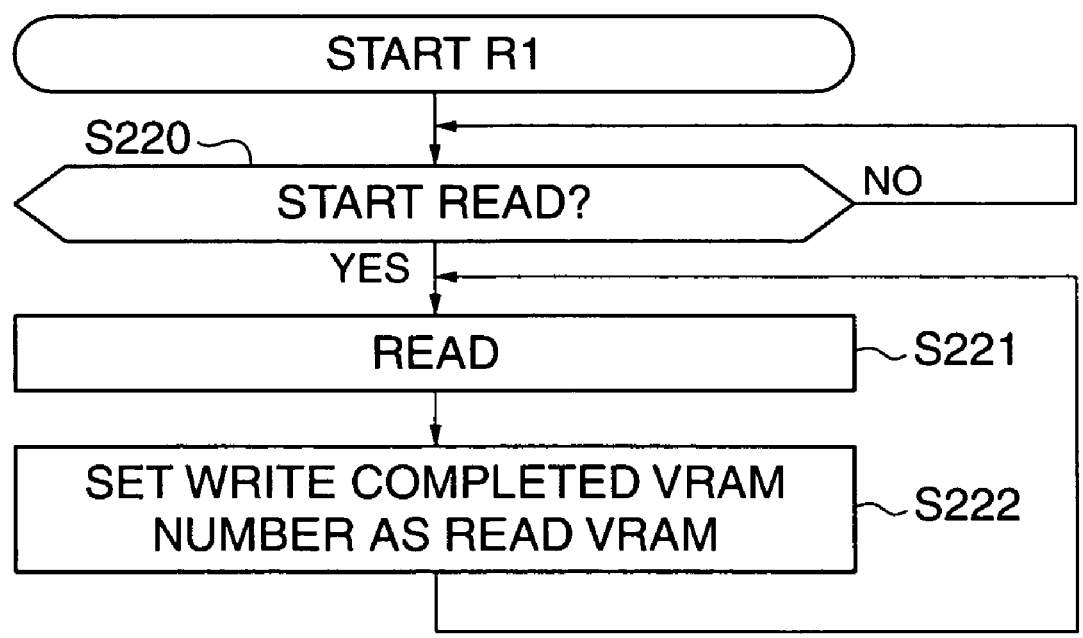
FIG. 15 is a flowchart showing the procedure of a R1 as a part of the VRAM write/read process executed by the image signal processing apparatus according to the second embodiment.

FIG. 15 is a flowchart showing the procedure of a R1 process (that is, reading of an image signal outputted from the VRAM section 111*a* to the image display processing circuit 105) as a part of the VRAM write/read process executed by the image signal processing apparatus 100 according to the second embodiment.

First, the process does not start the reading and stands by until a VRAM number is recorded in the write complete VRAM number recording section 142 (step S220). When the VRAM number is recorded in the write complete VRAM number recording section 142, an image signal is read from the VRAM area with the first VRAM number (step S221). When the reading is completed, a VRAM area with a VRAM number recorded in the write complete VRAM number recording section 142 is set as the VRAM area to be read next (step S222).

Figure 16:
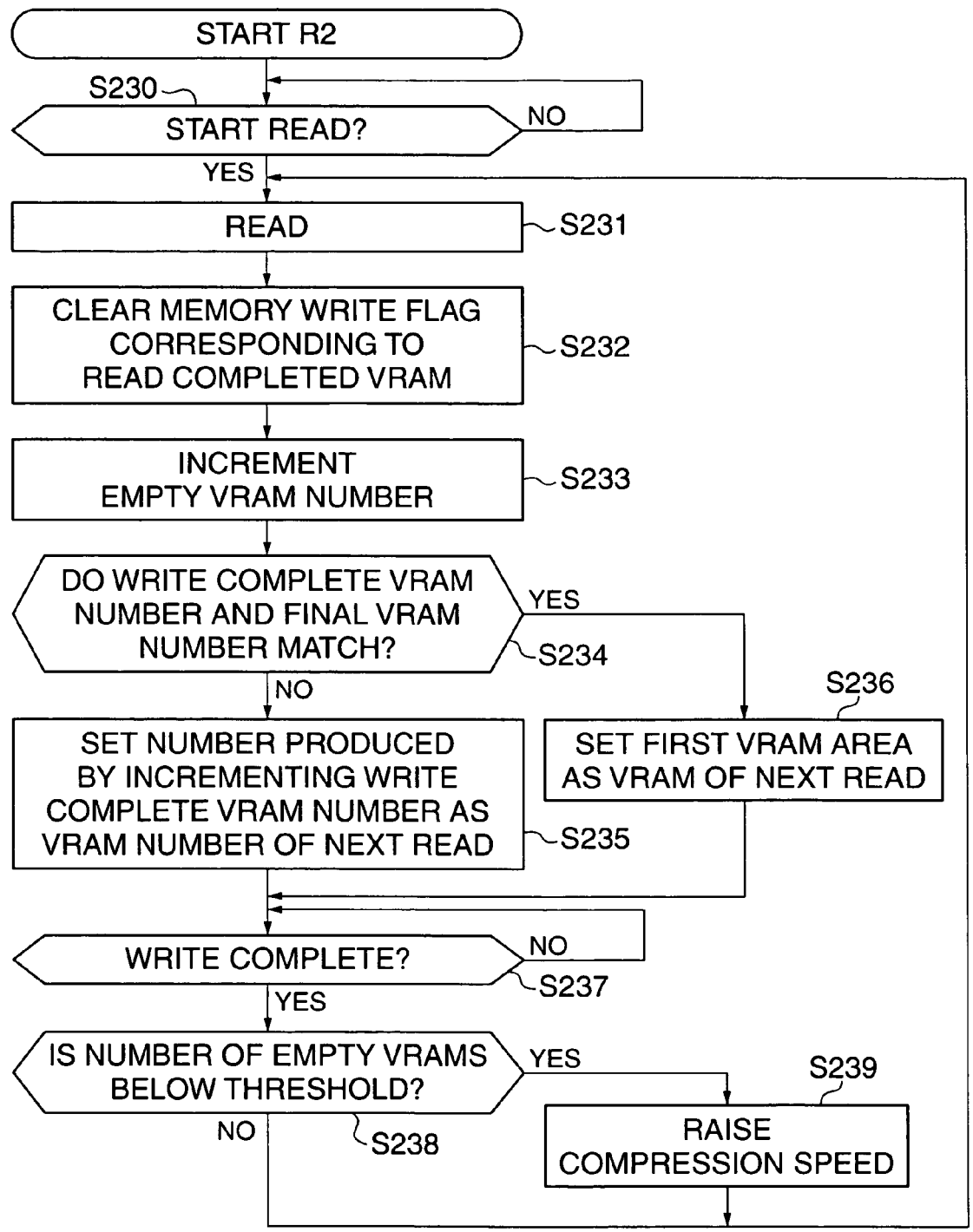
FIG. 16 is a flowchart showing the procedure of a R2 as a part of the VRAM write/read process executed by the image signal processing apparatus according to the second embodiment.

FIG. 16 is a flowchart showing the procedure of a R2 process (that is, reading of an image signal from the VRAM section 111*a* into the compression circuit 107) as a part of the VRAM write/read process executed by the image signal processing apparatus 100 according to the second embodiment.

The process stands by until the VRAM area written by W and the VRAM area read by R2 do not match (step S230), and then proceeds to a step S231, where an image signal is read from the VRAM area with the VRAM number recorded in the write complete VRAM number recording section 142 and compressed. When the reading is completed, the flag in the memory write flag area 141 corresponding to the VRAM number of the VRAM area for which the reading has been completed is cleared (step S232), and the number of VRAM areas written in the empty VRAM number recording section 143 is incremented (step S233).

Next, it is determined whether the VRAM number written in the write complete VRAM number recording section 142 matches the final VRAM number (4) (step S234). If the numbers match, the process proceeds to a step S236, or if the numbers do not match, the process proceeds to a step S235.

In the step S236, the VRAM area with the first number (1) is set as the VRAM area to be read next and the process proceeds to a step S237.

In the step S235, the VRAM area with the VRAM number produced by incrementing the number of the VRAM area for which the writing has been complete is set as the VRAM area to be read next and the process returns to a step S237.

In the step S237, the reading is waited until the writing by W into the VRAM area to be written next that was set in the step S235 or the step S236 is completed. When the writing is completed, the process proceeds to a step S238.

In the step S238, it is determined whether or not the number of empty VRAM areas written in the empty VRAM number recording section 143 is below a predetermined threshold. If the number is below the threshold, the process proceeds to a step S239, while if the number is not below the threshold, the step S239 is skipped and the process returns to the step S231.

In the step S239, the compression speed is increased such as by changing values in the quantization table (changing the compression ratio) of the compression circuit 107 to raise the compression ratio and/or increasing the frequency of the clock signal supplied to the compression circuit 107. By doing so, the number of VRAM areas that are yet to be read to the compression circuit 107 is reduced so that a larger number of empty VRAM areas can be reserved. Note that when raising the compression speed results in the number of empty VRAM areas becoming equal to the predetermined threshold or higher at a subsequent execution of the step S238, the values in the quantization table and the clock speed of the clock signal supplied to the compression circuit 107 are restored to the original values to reduce the compression speed.

Next, the VRAM write/read process described above will be described in more detail with reference to the example of the processing states of W, R1, and R2 shown in FIG. 12.

First, as the initialization process, the number of VRAM areas in the VRAM section 111a (i.e., 4) is recorded in the empty VRAM number recording section 143 (the step S201). The memory write flag area 141 is also cleared (the step S202).

At time "0" shown in FIG. 12, writing of an image signal by W into the VRAM area with the VRAM number 1 is started.

At time "t1w", the writing into the VRAM area with the VRAM number by W is completed and a flag corresponding to the VRAM number 1 is raised in the memory write flag area 141 (the step S212). The VRAM number 1 is also recorded into the write complete VRAM number recording section 142 (the step S213) and the number of empty VRAM areas recorded in the empty VRAM number recording section 143 is reduced from 4 to 3 (the step S214).

Here, the VRAM number 1 recorded in the write complete VRAM number recording section 142 does not match the VRAM number 4 of the final VRAM area ("NO" to the step S215), and therefore the VRAM number 2 obtained by incrementing the VRAM number 1 is set as the VRAM number of the VRAM area to be written next (the step S216).

Since at time "t1w", the VRAM number 1 has been recorded in the write complete VRAM number recording section 142, reading from the VRAM area with the VRAM number 1 by R1 is started (the steps S220 and S221).

Since at time "t1w", the flag in the memory write flag area 141 corresponding to the VRAM number 1 has been raised (the step S230), reading from the VRAM area with the VRAM number 1 by R2 is also started (the step S231).

At time "t1R2", the reading from the VRAM area with the VRAM number 1 by R2 is completed, and therefore the flag in the memory write flag area 141 corresponding to the VRAM number 1 is cleared (the step S232), and the number of empty VRAM areas recorded in the empty VRAM number recording section 143 is increased from 3 to 4 (the step S233). At this time, the VRAM number 1 recorded in the write complete VRAM number recording section 142 does not match the VRAM number 4 of the final VRAM area ("NO" to the step S234), and therefore the VRAM number 2 obtained by incrementing the VRAM number 1 is set as the VRAM number of the VRAM area to be written next (the step S235)

However, since at time "t1R2" the flag in the memory write flag area 141 corresponding to the VRAM number 2 is yet to be raised, the reading is waited until the writing by W into the VRAM area with the VRAM number 2 is completed at time "t2R2" and the flag in the memory write flag area 141 corresponding to the VRAM number 2 is raised (the step S237).

At time "t1R1", the reading from the VRAM area with the VRAM number 1 by R1 is completed. At this time, the VRAM number 3 has been registered in the write complete VRAM number recording section 142, and the VRAM area with the VRAM number 3 is set as the VRAM area to be read next (the step S222).

At time "t2w", the writing into the VRAM area with the VRAM number 4 by W is completed, the flag in the memory write flag area 141 corresponding to the VRAM number 4 is raised (the step S212), the VRAM number 4 is recorded in the write complete VRAM number recording section 142 (the step S213), and the number of empty VRAM areas recorded in the empty VRAM number recording section 143 is reduced from 4 to 3 (the step S214).

At this time, the VRAM number 4 recorded in the write complete VRAM number recording section 142 matches the VRAM number 4 of the final VRAM area ("YES" to the step S215), and therefore the first VRAM area with the VRAM number 1 is set as the number of the VRAM area to be written next (the step S217), and another write is carried out.

After this, as the VRAM write/read process proceeds according to the flowcharts shown in FIGS. 13 to 16, the operation shown in FIG. 12 is carried out.

It is to be understood that the present invention may also be accomplished by supplying a system or an apparatus with a storage medium in which a program code of software which realizes the functions of either of the above described embodiments is stored, and causing a computer (or CPU or MPU) of the system or apparatus to read out and execute the program code stored in the storage medium.

In this case, the program code itself read out from the storage medium realizes the new functions of the present invention, and hence the program code and the storage medium in which the program code is stored constitute the present invention.

Examples of the storage medium for supplying the program code include a flexible disk, a hard disk, a magneto-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be supplied by downloading from another computer, a database, or the like, not shown, connected to the Internet, a commercial network, a local area network, or the like.

Further, it is to be understood that the functions of either of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of either of the above described embodiments may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

According to the present invention, storage states of respective VRAM areas of a VRAM section are detected, management information indicative of the storage states are stored in a storage device, and reading and writing of the respective VRAM areas of the VRAM section are controlled based on the management information stored in the storage device.

As a result, it is possible to prevent the occurrence of "simultaneous display of an original image and the immediately preceding image" and the dropping of frames.

That is, even when the compression speed of a compression circuit is not fixed compared to an image pickup rate and a display rate, images can be compressed by the compression circuit without an original image and the immediately preceding image being simultaneously displayed on an image display apparatus, without frames being dropped in the image signal outputted from a signal processor, and without an original image and the immediately preceding image being mixed in the compressed images.

Also, by dynamically increasing the number of VRAMs when the number of VRAM areas provided in advance becomes insufficient, it is possible for the compression circuit to compress an image signal without lowering the bit rate. By controlling the compression bit rate, it is possible to store compressed images while reducing the required number of VRAM areas.

In addition, when selecting the VRAM area to be written next after writing of an image signal into a VRAM area has been completed, control over the selection of the VRAM area to be written next can be simplified by determining the VRAM by cycling through a series of VRAM numbers in the order thereof.

CROSS REFERENCE TO RELATED APPLICATION

This application claims priority from Japanese Patent Application No. 2004-200766 filed Jul. 7, 2004, which is hereby incorporated by reference herein.

What is claimed is:

1. An image signal processing apparatus comprising:
an image pickup device that outputs an image signal obtained by picking up an image from a subject;
a signal processing circuit that subjects the image signal output from said image pickup device to signal processing;
a VRAM (Video Random Access Memory) section composed of at least three VRAM areas that store the image signals output from said signal processing circuit, each of the output image signals being written selectively into one of the VRAM areas, wherein the number of the VRAM areas is changeable;
a VRAM management information storing section that stores management information including information indicating writing order of the corresponding VRAM area for which writing is to be completed, and information indicating that the corresponding VRAM area is the last VRAM area for which writing has been lastly completed;
a compression circuit that reads an image signal stored in the corresponding VRAM area for which writing has been completed based on the management information stored by said VRAM management information storing section, at a first reading speed in accordance with the writing order, and subjects the read image signal to compression processing, wherein the management information further includes memory write information indicating whether or not reading of an image signal to said compression circuit from the corresponding VRAM area is completed;
an image display processing circuit that reads an image signal stored in the last VRAM area, based on the management information stored by said VRAM management information storing section, at a second reading speed, and subjects the read image signal to image display processing, wherein the management information further includes memory read information indicating whether or not reading of an image signal from the last VRAM area is being carried out; and
a memory controller that:
determines whether a writable VRAM area of the VRAM section is available based on the memory write information and the memory read information, and
where the writable VRAM area is available:
selects the writable VRAM area as a VRAM area to be written an image signal output from said signal processing circuit,
prevents reading of an image signal overtaking writing of another image signal into the VRAM section during the writing of the another signal into the VRAM section, and
prevents writing of an image signal into the VRAM section overtaking reading of yet another image signal from the VRAM section during the reading of the yet another signal from the VRAM section.

2. An image signal processing apparatus according to claim 1, wherein after writing an image signal output from said signal processing circuit into one of the VRAM areas of said VRAM section has been completed, based on the memory write information and the memory read information, said memory controller selects a VRAM area from which reading of an image signal to said compression circuit is completed when reading of an image signal from the last VRAM area is not being carried out as a VRAM area into which an image signal is to be written next.

3. An image signal processing apparatus according to claim 1, wherein after writing an image signal output from said signal processing circuit into one of the VRAM areas of said VRAM section has been completed, in the case where the writable VRAM area is not available, said memory controller dynamically adds a new VRAM area to said VRAM section and sets the dynamically added new VRAM area as a VRAM area into which an image signal is to be written next.

4. An image signal processing apparatus according to claim 1, further comprising a controller operable when a speed of reading from said VRAM section is lower than a speed of writing into said VRAM section, to raise a compression speed of said compression circuit.

5. An image signal processing apparatus according to claim 1, further comprising a controller operable, when at least one VRAM area for which the compression process is yet to be carried out is available, to raise a compression speed of said compression circuit at the time when reading of an image signal from the at least one VRAM area has been completed by said compression circuit.

6. An image signal processing apparatus according to claim 1, wherein a series of numbers are assigned to the respective VRAM areas of said VRAM section, and said memory controller is operable when a number of one VRAM area of said VRAM section into which writing of an image signal output from said signal processing circuit has been completed is a final number in the series of numbers, to set a VRAM area assigned a first number in the series of numbers as a VRAM area to be written into next, and is operable when the number of the VRAM area into which the writing of the image signal has been completed is not a final number in the series of numbers, to set a VRAM area assigned a number obtained by incrementing the number of the VRAM area for which the writing has been completed as the VRAM area to be written into next.

7. An image signal processing apparatus according to claim 1, further comprising a first controller operable when a number of VRAM areas from each of which reading of an image signal to said compression circuit is completed when reading of an image signal from the last VRAM area is not being carried out is below a predetermined number, to raise a compression speed of said compression circuit.

8. An image signal processing apparatus according to claim 7, further comprising a second controller operable when as a result of the compression speed being raised by said first controller, when the number of VRAM areas from each of which reading of an image signal from the last VRAM area is not being carried out is no less than the predetermined number, to reduce the compression speed of said compression circuit to an original compression speed.

9. An image signal processing apparatus according to claim 7, wherein said first controller raises the compression speed by changing a compression ratio of said compression circuit or increasing a frequency of a clock signal supplied to said compression circuit.

10. A memory control method applied to an image signal processing apparatus including a signal processing circuit that subjects an image signal output from an image pickup device to signal processing, a VRAM section composed of at least three VRAM areas that store the image signals output from the signal processing circuit, each of the output image signals being written selectively into one of the VRAM areas, wherein the number of the VRAM areas is changeable, a VRAM management information storing section that stores management information including information indicating writing order of the corresponding VRAM area for which writing is to be completed, and information indicating that the corresponding VRAM area is the last VRAM area for which writing has been lastly completed, a compression circuit that reads an image signal stored in the corresponding VRAM area for which writing has been completed based on the management information stored by said VRAM management information storing section, at a first reading speed in accordance with the writing order, and subjects the read image signal to compression processing, wherein the management information further includes memory write information indicating whether or not reading of an image signal to said compression circuit from the corresponding VRAM area is completed, an image display processing circuit that reads an image signal stored in the last VRAM area, based on the management information stored by said VRAM management information storing section, at a second reading speed, and subjects the read image signal to image display processing, wherein the management information further includes memory read information indicating whether or not reading of an image signal from the last VRAM area is being carried out, the memory control method comprising:

determining step of determining whether a writable VRAM area of the VRAM section is available based on the memory write information and the memory read information;

a selecting step of, where the writable VRAM area is available, selecting the writable VRAM area as a VRAM area to be written an image signal output from the signal processing circuit;

a reading preventing step of, where the writable VRAM is available, preventing reading of an image signal overtaking writing of another image signal into the VRAM section during the writing of the another signal into the VRAM section; and a writing preventing step of, where the writable VRAM is available, preventing writing of an image signal into the VRAM section overtaking reading of yet another image signal from the VRAM section during the reading of the yet another signal from the VRAM section.

11. A memory control method according to claim 10, wherein after writing an image signal output from the signal processing circuit into one of the VRAM areas of the VRAM section has been completed, based on the memory write information and the memory read information the selecting step selects a VRAM area from which reading of an image signal to the compression circuit is completed when reading of an image signal from the last VRAM area is not being carried out as a VRAM area into which an image signal is to be written next.

12. A memory control method according to claim 10, wherein after writing an image signal output from the signal processing circuit into one of the VRAM areas of said VRAM section has been completed, in the case where the writable VRAM is not available, the method further comprises the steps of adding a new VRAM area dynamically to the VRAM section and setting the dynamically added new VRAM area as a VRAM area into which an image signal is to be written next.

13. A memory control method according to claim 10, further comprising a control step of raising a compression speed of the compression circuit when a speed of reading from the VRAM section is lower than a speed of writing into the VRAM section.

14. A memory control method according to claim 10, further comprising a control step of raising a compression speed of the compression circuit, when at least one VRAM area for which the compression process is yet to be carried out is available, to raise a compression speed of the compression circuit at the time when reading of an image signal from the at least one VRAM area has been completed by the compression circuit.

15. A memory control method according to claim 10, further comprising the steps of:

assigning a series of numbers to the respective VRAM areas of the VRAM section;

when a number of one VRAM area of the VRAM section into which writing of an image signal output from the signal processing circuit has been completed is a final number in the series of numbers, setting a VRAM area assigned a first number in the series of numbers as a VRAM area to be written into next; and when the number of the VRAM area into which the writing of the image signal has been completed is not a final number in the series of numbers, setting a VRAM area assigned a number obtained by incrementing the number of the VRAM area for which the writing has been completed as the VRAM area to be written into next.

16. A memory control method according to claim 10, further comprising a first control step of raising a compression speed of the compression circuit when a number of VRAM areas from each of which reading of an image signal to the compression circuit is completed when reading of an image signal from the last VRAM area is not being carried out is below a predetermined number.

17. A memory control method according to claim 16, further comprising a second control step of reducing the compression speed of the compression circuit to an original compression speed when as a result of the compression speed being raised in said first control step, when the number of VRAM areas from each of which reading of an image signal from the last VRAM area is not being carried out is no less than the predetermined number.

18. A memory control method according to claim 16, wherein said first control step comprises raising the compression speed by changing a compression ratio of the compression circuit or increasing a frequency of a clock signal supplied to the compression circuit.

19. A non-transitory computer-readable storage medium storing a computer program for an image signal processing apparatus including a signal processing circuit that subjects an image signal output from an image pickup device to signal processing, a VRAM section composed of at least three VRAM areas that store the image signals output from the signal processing circuit, each of the output image signals being written selectively into one of the VRAM areas, wherein the number of the VRAM areas is changeable, a VRAM management information storing section that stores management information including information indicating writing order of the corresponding VRAM area for which writing is to be completed, and information indicating that the corresponding VRAM area is the last VRAM area for which writing has been lastly completed, a compression circuit that reads an image signal stored in the corresponding VRAM area for which writing has been completed based on the management information stored by said VRAM management information storing section, at a first reading speed in accordance with the writing order, and subjects the read image signal to compression processing, wherein the management information further includes memory write information indicating whether or not reading of an image signal to said compression circuit from the corresponding VRAM area is completed, an image display processing circuit that reads an image signal stored in the last VRAM area, based on the management information stored by said VRAM management information storing section, at a second reading speed, and subjects the read image signal to image display processing, wherein the management information further includes memory read information indicating whether or not reading of an image signal from the last VRAM area is being carried out, the computer program comprising:

determining module for determining whether a writable VRAM area of the VRAM section is available based on the memory write information and the memory read information;

a selecting module for, where the writable VRAM area is available, selecting the writable VRAM area as a VRAM area to be written an image signal output from the signal processing circuit;

a reading preventing module for, where the writable VRAM is available, preventing reading of an image signal overtaking writing of another image signal into the VRAM section during the writing of the another signal into the VRAM section; and a writing preventing module for, where the writable VRAM is available, preventing writing of an image signal into the VRAM section overtaking reading of yet another image signal from the VRAM section during the reading of the yet another signal from the VRAM section.

* * * * *